United States Patent [19]

Tsuda et al.

[11] 3,920,311

[45] Nov. 18, 1975

[54] MICROSCOPE ILLUMINATOR USABLE BOTH FOR BRIGHT FIELD ILLUMINATION AND DARK FIELD ILLUMINATION

[75] Inventors: Hiroshi Tsuda, Mitaka; Kensaku Miyazaki, Machida, both of Japan

[73] Assignee: Olympus Optical Co., Ltd., Tokyo, Japan

[22] Filed: May 10, 1974

[21] Appl. No.: 468,987

[30] Foreign Application Priority Data

May 11, 1973  Japan................................ 48-52299

[52] U.S. Cl................ 350/89; 350/87; 350/160 LC; 240/2 MA
[51] Int. Cl.²................... G02B 21/06; G02B 21/10; G02F 1/13
[58] Field of Search......... 350/87, 89, 160 LC, 312; 240/2 MA

[56] References Cited
UNITED STATES PATENTS

| | | |
|---|---|---|
| 2,157,437 | 5/1939 | Shipley ................................ 350/89 |
| 2,415,732 | 2/1947 | Domingo ............................. 350/89 |
| 3,643,078 | 2/1972 | Lewis................................... 350/87 |
| 3,674,338 | 7/1972 | Cartmell et al.............. 350/160 LC |
| 3,737,687 | 6/1973 | Miller ................................... 350/89 |
| 3,798,435 | 3/1974 | Schindl................................. 350/87 |

Primary Examiner—Ronald J. Stern
Assistant Examiner—Jon W. Henry
Attorney, Agent, or Firm—Cushman, Darby & Cushman

[57] ABSTRACT

A microscope illuminator usable both for bright field illumination and dark field illumination comprising a shield plate which is so arranged as to prevent the light beams emerging from a light source from being directly incident on the observation optical system of the microscope and a liquid crystal cell which is arranged in the optical path from said light source, and adapted in such a manner that dark field illumination or bright field illumination can be selected by effecting or stopping voltage application to said liquid crystal cell.

2 Claims, 5 Drawing Figures

MICROSCOPE ILLUMINATOR USABLE BOTH FOR BRIGHT FIELD ILLUMINATION AND DARK FIELD ILLUMINATION

BACKGROUND OF THE INVENTION

1. Field of the Invention

The present invention relates to a microscope illuminator which is especially effective for microscopic-stereoscopic observation and photomicrography of objects.

2. Description of the Prior Art

For observing or photographing impurities contained in objects or optical anistropy thereof through microscopes, it is general to illuminate the objects by the dark field illumination methods. The reson to adopt such dark field illumination methods is that they permits microscopists to observe or phtograph images formed by the rays scattered by the objects while the illumination light beams are kept prevented from being incident directly on the observation optical system or photographing optical system of microscopes. Dark field illuminators utilizing such methods, therefore, adopt a shield plate or similar element which serves for preventing the illumination light beams from falling directly on the observation optical system, etc. An example of such dark filed illuminator is shown in FIG. 1, in which a main unit 1 of the illuminator, a light source which is an annular or rod-shaped fluorescent lamp or plural miniature lamps, a shield plate 3, a transparent plate 4 on which an object 5 is to be placed, and observation optical system are shown. In such a dark field illuminator, some of the light beams 7 emerging from the light source 2 are interrupted by the shield plate 3 so that they will not fall directly on observation optical system 6 but only the rays refracted and/or scattered by object 5 are incident on observation optical system, thereby permitting microscopic observation under dark filed illumination. In case where microscopic observation under bright field illumination is desired by means of such a dark filed illuminator, on the other hand, it is necessary to remove shield plate 3 to allow light beams 7 emerging from light source 1 to fall directly on obervation optical system 6, or to use diffuser plate 4' made of a material such as opal glass in place of transparent plate 4 as shown in FIG. 2 and to place the object on diffuser plate 4'. However, the former method has some drawbacks in that the component parts may be broken by shield plate 3 during removal thereof or dust or other foreign matter may enter the interior of the main unit of the dark field illuminator. The latter method also has some or other shortcoming in that it requires a holding mechanism for the diffuser plate and so on.

SUMMARY OF THE INVENTION

The object of the present invention is to provide a microscope illuminator usable as a bright field illuminator and a dark field illuminator which comprises a liquid crystal cell instead of said transparent plate and is arranged in such a manner that voltage application to said liquid crystal cell can be started or stopped as desired.

DETAILED DESCRIPTION OF THE PREFERRED EMBODIMENTS

Figure 1:
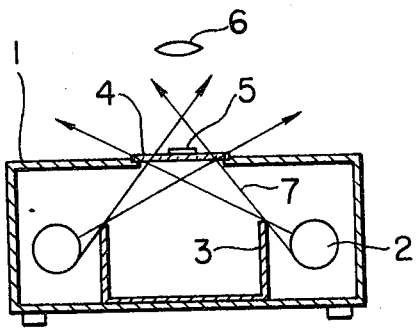
FIG. 1 is a sectional view of an example of conventional dark field illuminators.
Figure 3:
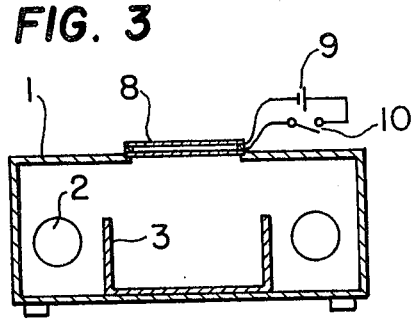
FIG. 3 is a sectional view illustrating a preferred embodiment of the present invention.
Figure 4:
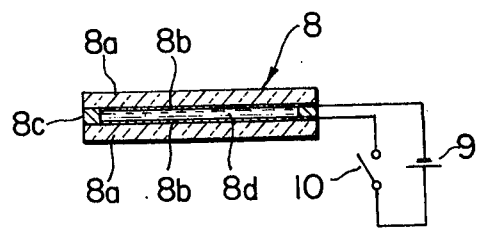
FIG. 4 is a sectional view of the liquid crystal cell used in the microscope illuminator according to the present invention.

Now, the present invention will be detailed with reference to the drawings attached hereto:

In FIG. 3, numeral 1 denotes the main unit of the illuminator, numeral 2 denotes a light source and numeral 3 denotes a shield plate, said three components being quite similar to those which are used in the conventional type of the dark field illuminator shown in FIG. 1. Numeral 8 is a liquid crystal cell, numeral 9 is a power supply and numeral 10 is a switch. The construction of liquid crystal cell 8 is detailedly illustrated in FIG. 4. The liquid crystal cell 8 is composed of two glass plates 8a which are provided with a transparent electrode 8b made of transparent conductive layer, for example, $SnO_2$ and arranged with two spacers interposed therebetween to form a space in which liquid crystal 8d, for example nematic compound is enclosed.

While no voltage is being applied between transparent electrodes 8b in liquid crystal cell 8 which is constructed as described above, liquid crystal 8d remains transparent and, accordingly, liquid crystal cell 8 serves only as a transparent plate. The light beams incident on the liquid crystal cell 8 can pass through it under this condition. While, on the other hand, the liquid crystal becomes turbid whitish when a voltage is applied to transparent electrodes 8b. Under such a condition, the liquid crystal cell scatters and disperses light beams which are incident on it.

Figure 2:
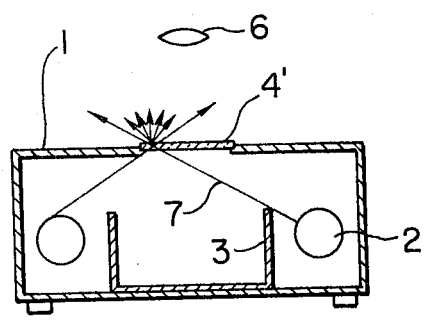
FIG. 2 is a sectional view of the illuminator shown in FIG. 1 in which a transparent plate is replaced by a diffuser plate for using the illuminator as a bright fiel illuminator.

Since the microscope illuminator according to the present invention has such a construction as described above, it can serve as a dark field illuminator quite similar to the conventional dark field illuminator shown in FIG. 1 when switch 10 is turned off as shown in FIG. 3 so as not to apply voltage to the transparent electrodes 8b of liquid crystal cell 8 and to keep the liquid crystal cell 8 under the transparent condition. While, on the other hand, transparency of the liquid crystal is reduced and the liquid crystal cell comes to scatter and disperse the incident light beams when the switch 10 is turned on to apply a voltage to the transparent electrodes 8b arranged on the liquid crystal cell 8. Under this condition, the microscope illuminator according to the present invention can therefore serve as a bright field illuminator which is quite similar to the conventional one using a diffuser plate as shown in FIG. 2.

Figure 5:
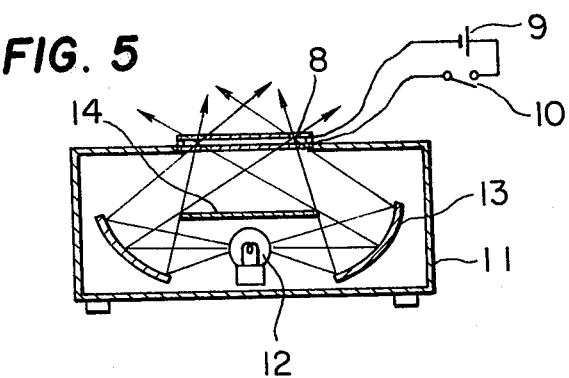
FIg. 5 is a schematic representation illustrating another embodiment of the present invention.

FIG. 5 illustrates another embodiment of the present invention which has such a construction as to illuminate an object with light beams reflected, for example, by an annular concave mirror (a spherical mirror without bottom). Speaking more specifically, a light source 12, a circular relfecting mirror 13 and a shield plate 14 are arranged inside the main unit 11 of the illuminator and, in addition, a liquid crystal cell 8 is mounted on the illumination aperture in the similar manner to that in the embodiment shown in FIG. 3. The construction of this liquid crystal cell 8 is also quite similar to the illustrated in FIg. 4. In this embodiment, the light beams emerging from the light source 12 are reflected by the circular reflecting mirror 13 and illuminate an object in the oblique directions. Also in this embodiment, the liquid crystal cell 8 is kept under transparent condition and the illuminator is set for dark field illumination for obliquely illuminating the object while voltage is not being applied to the liquid crystal cell 8. While, on the other hand, the liquid crystal cell serves as a diffuser plate for effecting bright field illumination when a voltage is applied to the liquid crystal cell. Though the descriptions and drawings are given in the foregoing on the assumption that a direct current power supply is to be used for the microscope illuminator, it is also possible to adopt an alternating current power supply.

As is easily understood from the descriptions give in the foregoing, the microscope illuminator according to the present invention has a simple construction which is available in very simple procedure to mount a liquid crystal cell on the illumination aperture of various types of conventional dark field illuminators and is usable not only as a dark field illuminator but also as a bright field illuminator through a simple switch operation.

Further, the microscope illuminator according to the present invention offers advantages over the conventional ones that it does not require any tedious procedures to mount and dismount the shield plate and diffuser plate for switching between the dark field illumination and bright field illumination and that it completely excludes the possibility for the component parts to be broken and prevents dust and other foreign matters from entering the interior of the microscope illuminator during the mounting and dismounting of the plates mentioned above.

We claim:

1. A microscope illuminator usable for alternative dark field illumination and bright field illumination of an observation optical system comprising a light source; a shield plate disposed in the optical path between said light source and said optical system to prevent the light beams emerging from said light source from being directly incident along said optical path on the observation optical system of the microscope; a liquid crystal cell composed of two glass plates disposed in said optical path, provided on their opposing surfaces with a transparent electrode and enclosing liquid crystal therebetween and having a light transmitting state causing dark field illumination and a light diffusing state causing bright field illumination; an electrical switch and a power supply which is connected via said switch to said transparent electrodes of said liquid crystal cell so that the light conduction of said cell can be shifted from said transmitting to said diffusing state and vice versa by operation of said switch.

2. A microscope illuminator usable both for dark field illumination and bright field illumination according to claim 1 comprising an annular concave reflecting mirror and said light source arranged in the middle of said annular concave reflecting mirror.

\* \* \* \* \*